(12) United States Patent
Hirschkorn et al.

(10) Patent No.: US 7,909,298 B2
(45) Date of Patent: Mar. 22, 2011

(54) CHILD SEAT FIXING DEVICE

(75) Inventors: Joerg Hirschkorn, Boeblingen (DE); Willi Hornemann, Gechingen (DE); Bernd Kestler, Schesslitz (DE); Markus Scholz, Waldenbuch (DE); Hans Weisbarth, Renningen (DE)

(73) Assignee: Daimler AG, Stuttgart (DE)

( * ) Notice: Subject to any disclaimer, the term of this patent is extended or adjusted under 35 U.S.C. 154(b) by 887 days.

(21) Appl. No.: 11/660,554

(22) PCT Filed: Aug. 18, 2005

(86) PCT No.: PCT/EP2005/008947
§ 371 (c)(1),
(2), (4) Date: Aug. 16, 2007

(87) PCT Pub. No.: WO2006/021364
PCT Pub. Date: Mar. 2, 2006

(65) Prior Publication Data
US 2009/0315369 A1    Dec. 24, 2009

(30) Foreign Application Priority Data
Aug. 21, 2004   (DE) .................. 10 2004 040 573

(51) Int. Cl.
*A47F 5/00* (2006.01)
(52) U.S. Cl. .................. 248/301; 248/220.1; 297/463.1; 297/471; 297/472
(58) Field of Classification Search .................. 248/301, 248/300, 304, 220.1, 220.21; 297/471, 472; 297/463.1
See application file for complete search history.

(56) References Cited

U.S. PATENT DOCUMENTS

| 3,144,697 | A | 8/1964 | Rosenberg |
| 3,198,288 | A | 8/1965 | Presunka |
| 5,468,044 | A | 11/1995 | Coman |
| 5,639,144 | A | 6/1997 | Naujokas |
| 5,941,600 | A | 8/1999 | Mar et al. |
| 2003/0066938 | A1 * | 4/2003 | Zimmerman .................. 248/301 |
| 2003/0155475 | A1 * | 8/2003 | Hicks ............................ 248/301 |
| 2004/0051356 | A1 | 3/2004 | Neelis |
| 2004/0159756 | A1 * | 8/2004 | Albertson .................. 248/227.1 |

FOREIGN PATENT DOCUMENTS

| DE | 1 231 123 B | 1/1961 |
| DE | 198 00 072 A1 | 7/1999 |
| DE | 695 11 954 T2 | 12/1999 |
| EP | 0 689 955 A1 | 1/1996 |
| EP | 0 696 526 A1 | 2/1996 |

OTHER PUBLICATIONS

International Search Report dated Oct. 6, 2006, and PCT/ISA/237 with English translation of relevant portions (Thirteen Pages).
German Search Report dated Oct. 18, 2006 with English translation of relevant portion (Five Pages).
German Office Action dated Jan. 8, 2008 with English translation of relevant portion (Five pages).

* cited by examiner

*Primary Examiner* — Ramon O Ramirez
(74) *Attorney, Agent, or Firm* — Crowell & Moring LLP

(57) ABSTRACT

A device is provided for fixing a child seat to a support structure of a motor vehicle, including a plastically deformable holding device, which is fixed to the support structure and has a holding element to which a fixing element, which is attached to the child seat, can be fixed. In order to permit a defined movement of the holding element during deformation of the holding device, the holding device has at least one bending axis along which the holding device can be deformed when a force, such as a tensile force, acts on the holding element.

17 Claims, 5 Drawing Sheets

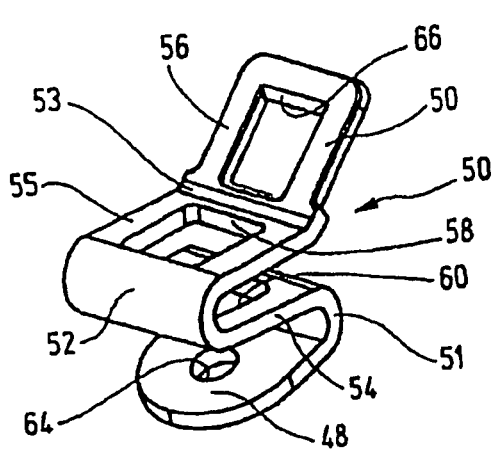
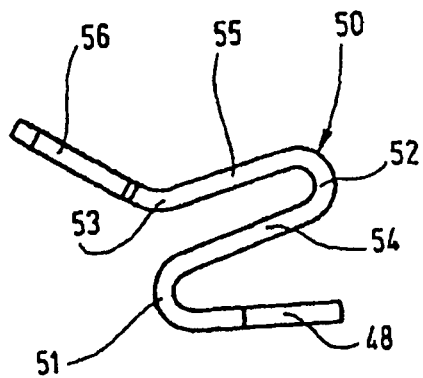
Fig.8
Fig.9
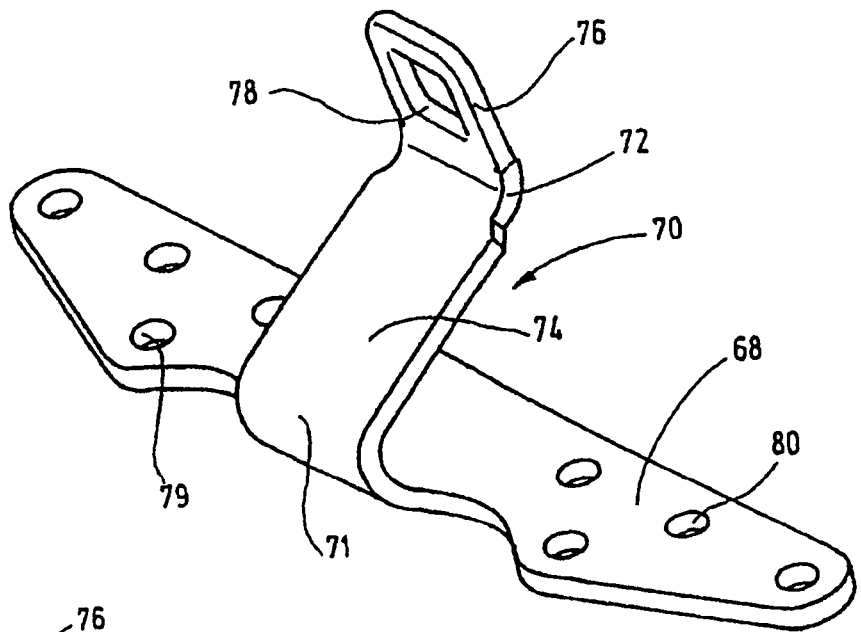
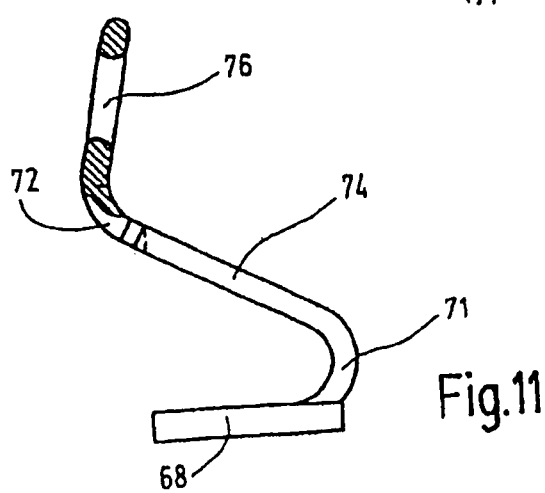
Fig.10
Fig.11

CHILD SEAT FIXING DEVICE

CROSS REFERENCE TO RELATED APPLICATIONS

This application is a national stage of PCT International Application No. PCT/EP2005/008947, filed Aug. 18, 2005, which claims priority under 35 U.S.C. §119 to German Patent Application No. 10 2004 040 573.5, filed Aug. 21, 2004, the entire disclosures of which are herein expressly incorporated by reference.

BACKGROUND AND SUMMARY OF THE INVENTION

The present invention relates to a device for fixing a child seat to a support structure of a motor vehicle with a plastically deformable holding device, which is fixed to the support structure and has a holding element to which a fixing element, which is attached to the child seat, can be fixed.

The fixing element may be a fixing hook, which is attached to one end of a strap, the other end of which is fixed to the upper region of the child seat. The strap with the hook is also referred to as a Top Tether, which is used in the USA and Canada for fixing child seats to the vehicle structure.

German laid-open specification DE 198 00 072 A1 discloses a restraint system for a child seat, which is carried in a motor vehicle and is deposited on a seat of the motor vehicle. The child seat is provided with at least one integrated latching device which, during the fixing of the deposited child seat, enters into engagement with at least one fixing device attached to the seat or, in the vicinity thereof, to a body part of the motor vehicle and is fixed on the seat or vehicle. To improve the restraining capability of the latching or fixing device, at least one deformation element is arranged between the child seat and the seat or the body part, the deformation element plastically deforming when a predetermined force is exceeded, thereby permitting a limited forward movement of the child seat in relation to the vehicle seat in order to reduce a peak stressing of the latching and/or fixing device.

The German translation DE 695 11 954 T2 of European patent specification EP 0 689 955 B1 discloses a child seat fixing device, which contains an energy-absorbing plate member having a first tab and a second tab and a first edge and a second edge, which edges extend therebetween, and having a center portion which is substantially midway between the first and second tabs.

It is an object of the present invention to provide a device for fixing a child seat to a support structure of a motor vehicle, with a plastically deformable holding device, which is fixed to the support structure and has a holding element to which a fixing element, which is attached to the child seat, can be fixed. The fixing device permits a defined movement of the holding element during deformation of the holding device, and not just in the vehicle longitudinal direction.

This and other objects and advantages are achieved by the device according to the invention for fixing a child seat to a support structure of a motor vehicle, in which a plastically deformable holding device fixed to the support structure has a holding element to which a fixing element (attached to the child seat) can be fixed. The holding device has at least one bending axis, along which it can be deformed when a force, such as a tensile force, acts on it. In known child seat fixing devices, the holding element moves in the direction in which the force applied to the holding element acts, i.e., generally in the vehicle longitudinal direction. In child seat fixing devices according to the present invention, the bending axis permits a defined movement of the holding element, for example, on an arc of a circle.

In a further exemplary embodiment of the device, the bending axis is arranged transversely with respect to the vehicle longitudinal direction. The effect achieved by this is that the holding element moves on an arc of a circle when a tensile force is applied to the holding element.

In another exemplary embodiment of the device, the holding device has a plurality of bending axes, which are arranged transversely with respect to the vehicle longitudinal direction and are designed such that the holding device is successively deformed in a defined bending sequence along a particular bending axis when a force, such as a tensile force, acts on the holding element. By means of the bending sequence, kinematics can be predetermined for the holding element under load such that the holding element does not come to bear against the support structure when the holding device is deformed.

In another exemplary embodiment of the device, the holding device has a first bending axis, which, both in the undeformed and in the deformed state of the holding device, is arranged below the upper edge of the support structure. The holding device has a second bending axis, which, in the undeformed state of the holding device, is arranged below the upper edge of the support structure and below the first bending axis, and, in the deformed state, is arranged above the upper edge of the support structure. The distance between the bending axes may be greater than the distance of the first bending axis from the upper edge of the support structure. The effect achieved by the above-described structure is that, during deformation of the holding device, the holding element does not come to bear against the support structure.

In another exemplary embodiment of the device, the holding device has a fixing portion delimited by the first bending axis, a holding portion delimited by the second bending axis, and a lever portion arranged between the two bending axes. The fixing portion can have at least one through hole which serves to receive a fixing element, such as a screw. The holding portion and/or the lever portion can be provided with at least one cutout.

In another exemplary embodiment of the device, the holding device has a first bending axis delimiting a fixing portion, a second bending axis, and a third bending axis, delimiting a holding portion, wherein a respective lever portion is formed between the first and second bending axes and between the second and third bending axes. The three bending axes make it possible to significantly reduce the loading of the support structure.

In another exemplary embodiment of the device, the holding device is formed from a piece of plastically deformable sheet metal. Apertures and/or predetermined points of weakness may be provided in the sheet metal in order to restrict the level of force linearly, degressively or progressively.

Other objects, advantages and novel features of the present invention will become apparent from the following detailed description of the invention when considered in conjunction with the accompanying drawings.

BRIEF DESCRIPTION OF THE DRAWINGS

FIG. 8 is a perspective illustration of a holding device with three bending axes;

FIG. 9 shows a side view of the holding device from FIG. 8;

FIG. 10 shows a perspective illustration of a holding device with two bending axes, and FIG. 11 shows a side view of the holding device from FIG. 10.

DETAILED DESCRIPTION OF THE DRAWINGS

Figure 1:
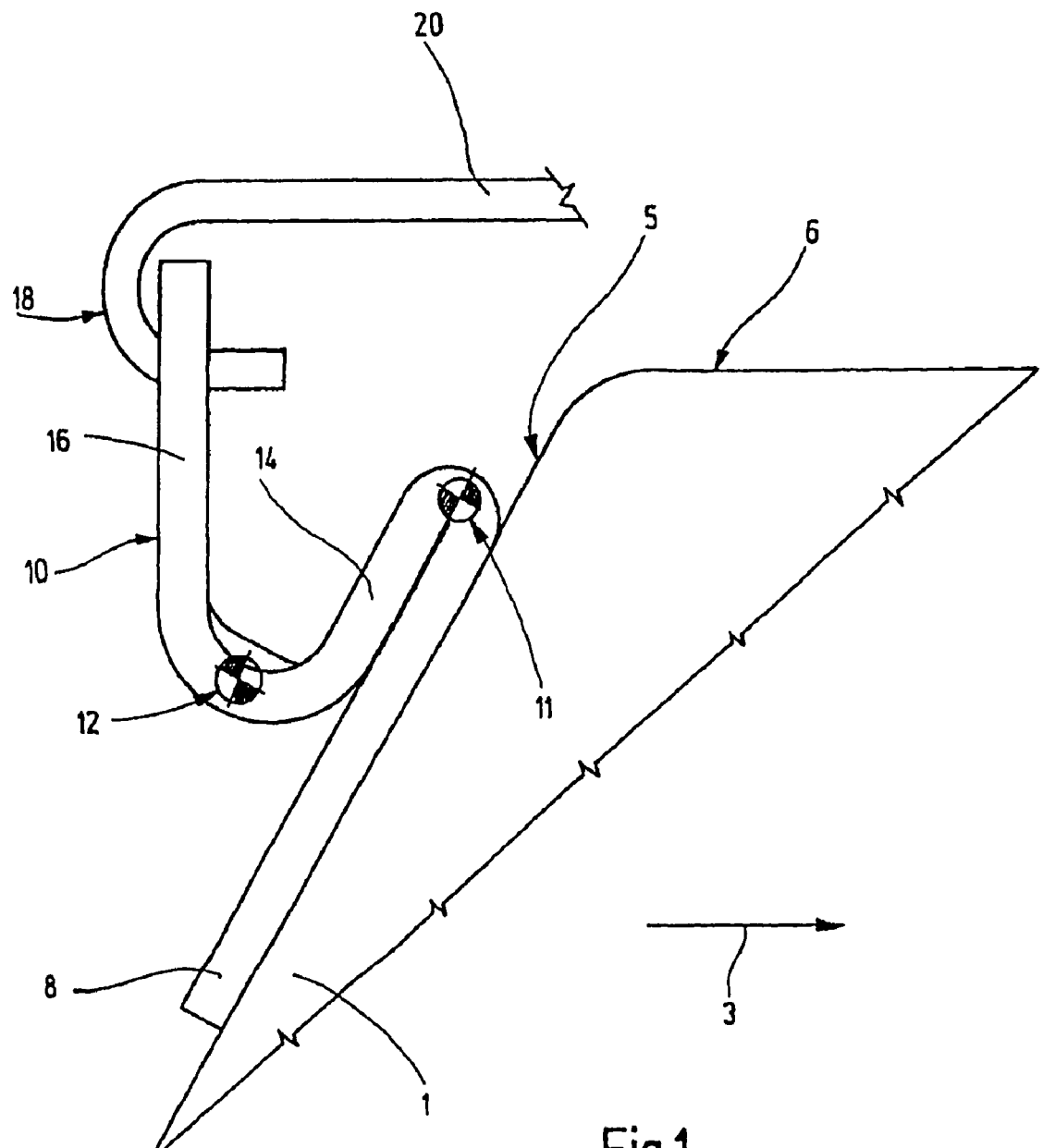
FIG. 1 is a schematic illustration of a holding device, which is fixed to a support structure, in the undeformed state.

FIG. 1 schematically illustrates a support structure 1 of a motor vehicle. The vehicle longitudinal direction is indicated by an arrow 3. The support structure 1 is, for example, part of the rear parcel shelf of the motor vehicle. The support structure 1 has an oblique surface 5 and an upper side 6 running horizontally. A fixing portion 8 of a holding device 10 is fixed to the oblique surface 5. The fixing portion 8 is delimited by a first bending axis 11, which is arranged transversely with respect to the vehicle longitudinal direction 3.

The holding device 10 has a second bending axis 12, which is likewise arranged transversely with respect to the vehicle longitudinal direction 3. A lever portion 14, which, in the undeformed state of the holding device 10, bears against the fixing portion 8, is formed between the first bending axis 11 and the second bending axis 12. A holding portion 16, which is arranged transversely with respect to the vehicle longitudinal direction 3, i.e., vertically, emerges from the second bending axis 12. A tensioning hook 18, which is attached to a fixing element 20, engages in the holding portion 16.

The tensioning hook 18 and the fixing element 20 form a "Top Tether" which serves to fix the upper region of a child seat in the region of the upper end of the backrest of a motor vehicle seat. A Top Tether includes, for example, an upper lashing strap which is fixed to the child seat and to the support structure. Top Tethers of this type are used in the USA and Canada for fixing child seats to the vehicle structure.

Figure 2:
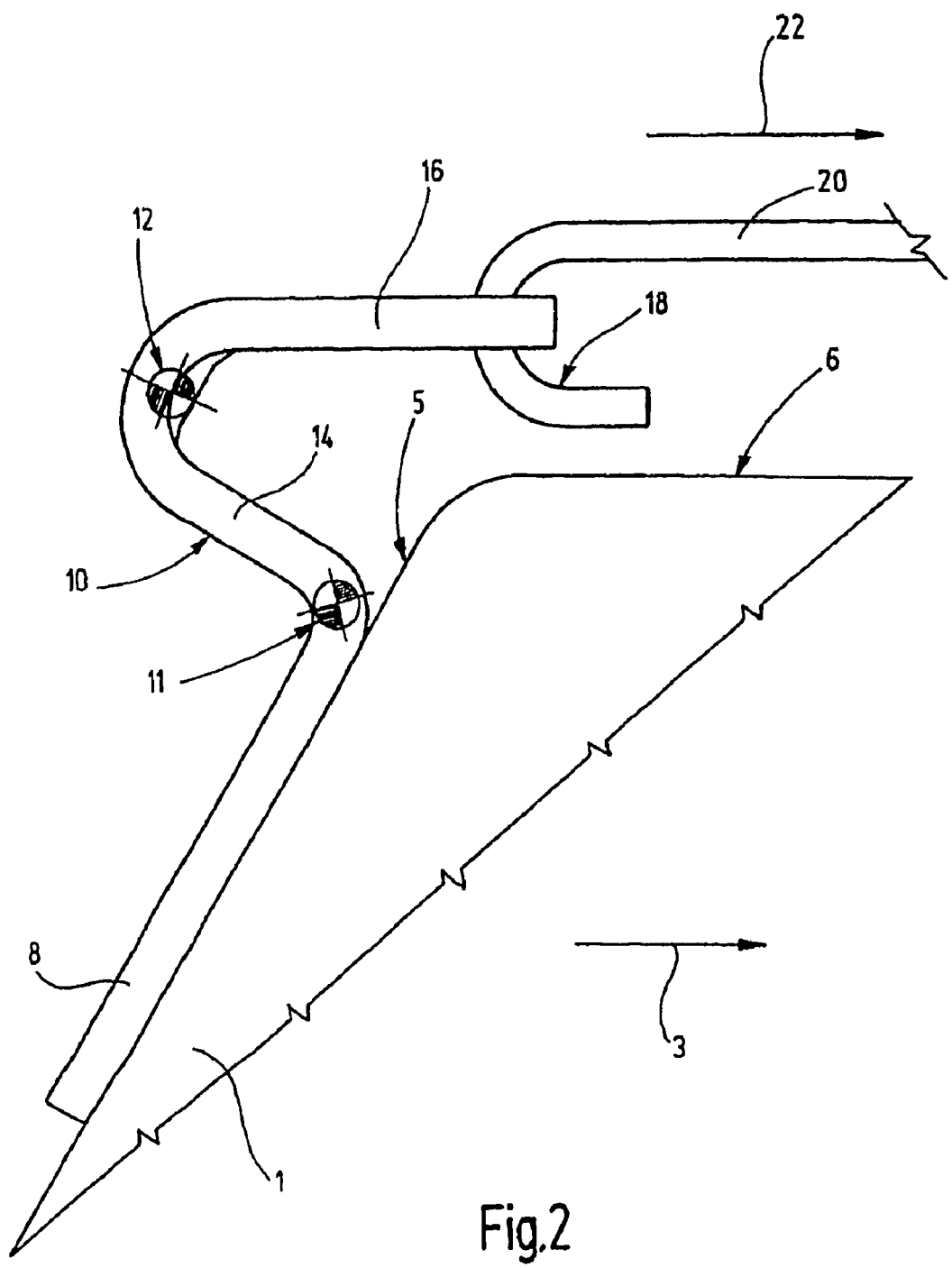
FIG. 2 shows the holding device from FIG. 1 after deformation about a first bending axis.

FIG. 2 illustrates the holding device 10 in a first deformation state. A force has been applied via the tensioning hook 18 in the tensioning direction 22 to the holding portion 16 of the holding device 10. As a result, the lever portion 14 of the holding device 10 has been deformed from the position illustrated in FIG. 1 through approximately 90° about the first bending axis 11. The lever portion 14 is arranged approximately at right angles to the oblique surface 5. A deformation about the second bending axis 12 has not yet taken place. The holding portion 16 is arranged above the upper side 6 of the support structure 1 approximately parallel to the upper side 6. This ensures that the tensioning hook 18 does not bear against the support structure 1 but rather is spaced apart therefrom.

Figure 3:
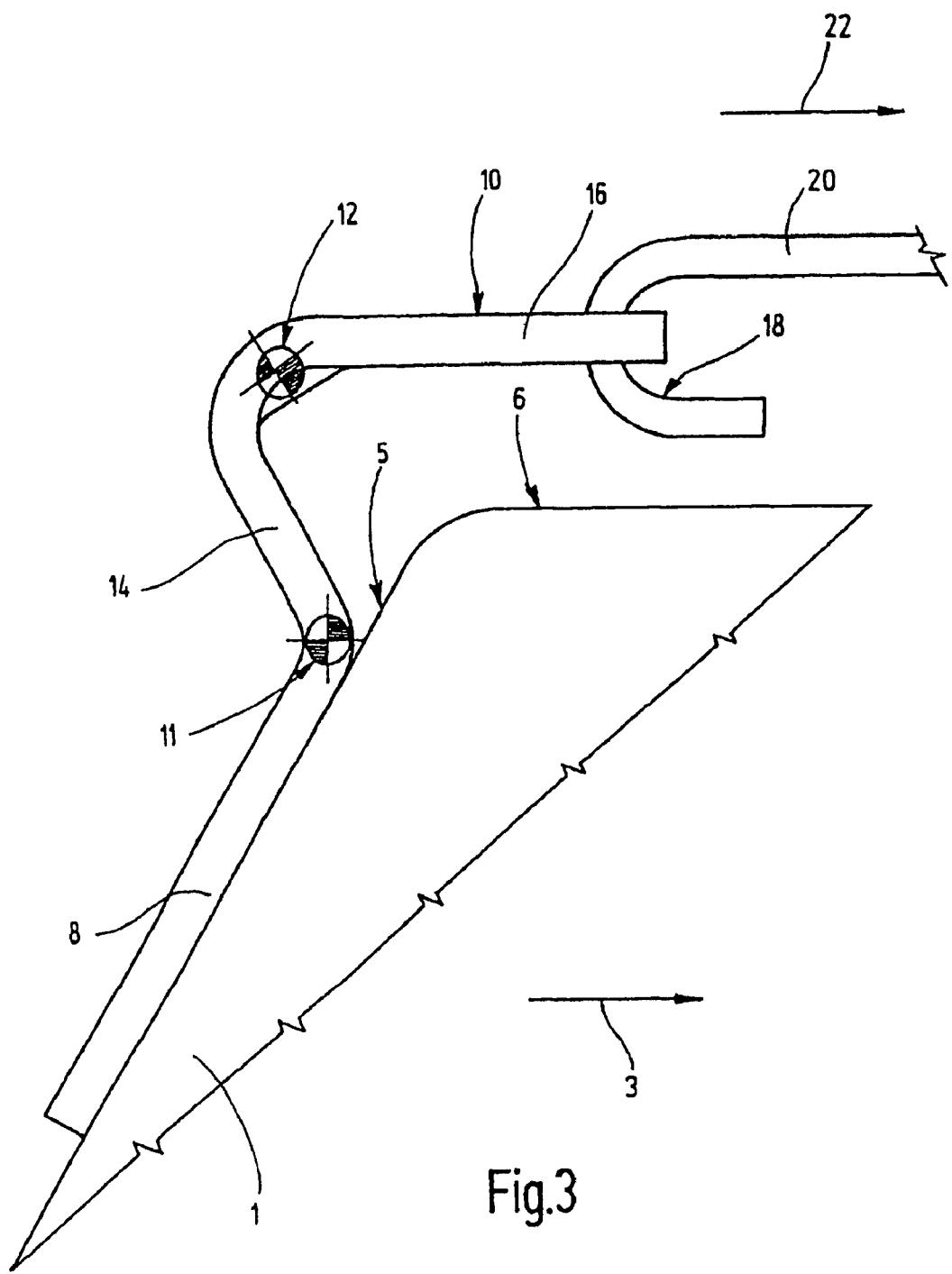
FIG. 3 shows the holding device from FIG. 1 after deformation about a second bending axis.

FIG. 3 illustrates a second deformation state of the holding device 10. A force has continued to be applied via the tensioning hook 18 in the tensioning direction 22 to the holding portion 16 of the holding device 10. The further application of force has caused the lever portion 14 to deform even further about the first bending axis 11. In addition, the holding portion 16 has been deformed in relation to the lever portion 14 about the second bending axis 12. The holding portion 16 and the tensioning hook 18 fixed thereto are also arranged above the upper side 6 of the support structure 1 in the second deformation state of the holding device 10, which state is illustrated in FIG. 3.

Preferred bending lines can be predetermined by the special construction of the holding device. The bending line regions may be designed in such a manner that a defined bending sequence is achieved. By means of the bending sequence, kinematics can be predetermined for the tensioning hook such that the deformation first of all takes place about the first bending axis 11, with the tensioning hook not coming to bear against the support structure. As the level of force rises, a deformation about the second bending axis also takes place, and the holding device can stretch without the tensioning hook coming to bear against the support structure. By means of a suitable weakening of the holding device along the first bending axis and the addition of a bead in the region of the second bending axis, a reproducible bending kinematics is imposed on the holding device.

Figure 4:
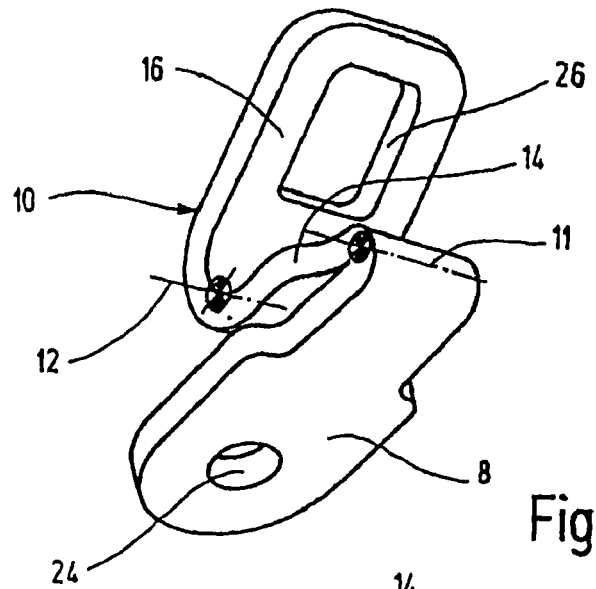
FIG. 4 shows a perspective illustration of the holding device from FIG. 1.
Figure 5:
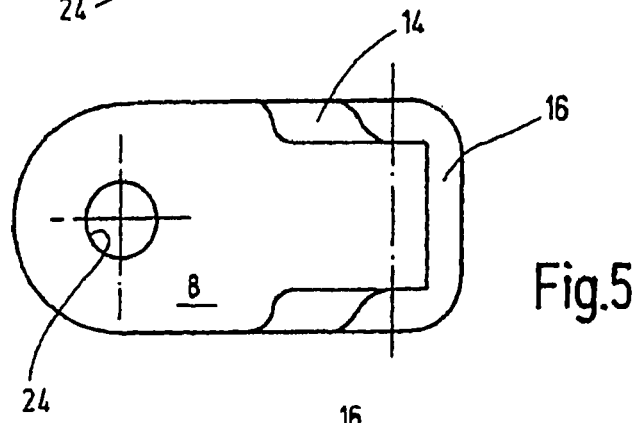
FIG. 5 shows a bottom view of the holding device from FIG. 1.
Figure 6:
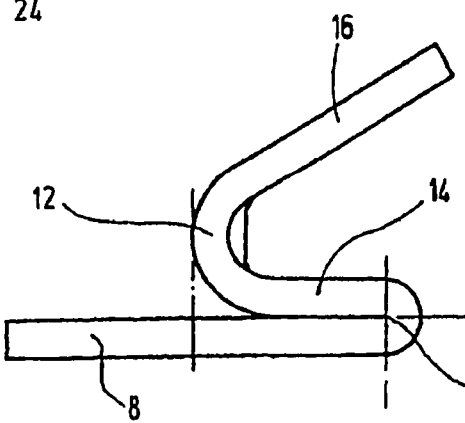
FIG. 6 shows a side view of the holding device from FIG. 1.
Figure 7:
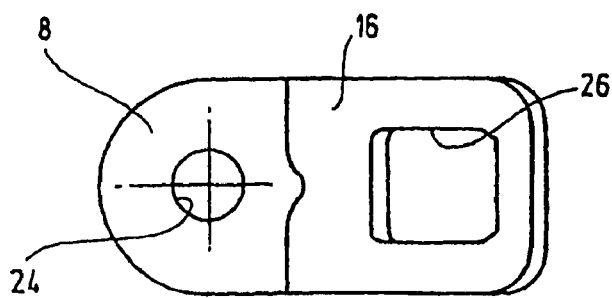
FIG. 7 shows a plan view of the holding device from FIG. 1.

FIGS. 4 to 7 illustrate the holding device 10 from FIGS. 1 to 3 on its own in different views. It can be seen in FIGS. 4, 5 and 7 that a through hole 24 is provided in the fixing portion 8, which through hole serves, for example, to receive a screw with which the holding device 10 can be fixed to the support structure. In FIGS. 4 and 7, it can be seen that an essentially rectangular cutout 26, which permits the engagement of the tensioning hook, is provided in the holding portion 16.

FIGS. 8 and 9 illustrate a holding device 50, which has a fixing portion 48, in different views. The holding device 50 has a first bending axis 51, a second bending axis 52 and a third bending axis 53. The bending axes 51 to 53 are arranged parallel to one another. The first bending axis 51 delimits the fixing portion 48. A first lever portion 54 is formed between the first bending axis 51 and the second bending axis 52. A second lever portion 55 is formed between the second bending axis 52 and the third bending axis 53. A holding portion 56 which, like the lever portions 54 and 55, is of essentially rectangular design emerges from the third bending axis 53. The second lever portion 55 has an essentially rectangular cutout 58. The first lever portion 54 has an essentially rectangular cutout 60. The fixing portion 48 is rounded at its free end. A through hole 64 which serves to receive a fixing element is provided in the fixing portion 48. An essentially rectangular cutout 66 is provided in the holding portion 56.

The type and the design of the various portions of the holding device, such as the shaping and the position of the apertures or predetermined points of weakness, enable the level of force to be restricted linearly, degressively or progressively. The holding device 10 is of partially elastic design in order to restrict the level of force and to open up a defined path. As a result, the load to which the occupant is subjected is kept to an extent which is as small as possible. During the application of a tensile force, the tensioning hook (tether hook) avoids resting on body parts and therefore failure of the hook is avoided. The loading to which the vehicle body is subjected is reduced. It is also possible to use the holding device according to the invention for an Isofix connection.

FIGS. 10 and 11 illustrate a further exemplary embodiment of a holding device according to the invention in different views. A holding device 70 has an elongate fixing portion 68, which can be fixed to a support structure (not illustrated) of a motor vehicle. The holding device 70 has a first bending axis 71 and a second bending axis 72. The bending axes 71 and 72 are arranged parallel to each other. The first bending axis 71 delimits the central region of the fixing portion 68. A lever portion 74 is formed between the first bending axis 71 and the second bending axis 72. A holding portion 76 which has an essentially rectangular cutout 78 emerges from the second bending axis 72. In the fixing portion 68, a plurality of through holes 79 and 80 are provided in the two lateral regions and serve to receive fixing elements, such as screws, in order to fix the holding device 70 to the support structure of the motor vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A plastically deformable holding device for fixing a child seat to a support structure of a motor vehicle, comprising:
   a holding element attachable to a fixing element of the child seat; and
   at least one bending axis along which the holding device is deformable when a tensile force acts on the holding element; wherein
   the holding device is configured to be attachable to the support structure,
   the holding device has a plurality of bending axes arranged transversely with respect to the vehicle longitudinal direction, and
   the holding device is configured to be successively deformed in a defined bending sequence along a particular bending axis when the tensile force acts on the holding element.

2. The device as claimed in claim 1, wherein the bending axis is arranged transversely with respect to the vehicle longitudinal direction.

3. The device as claimed in claim 2, wherein:
   the holding device includes a plurality of bending axes arranged transversely with respect to the vehicle longitudinal direction, and
   the holding device is configured to be successively deformed in a defined bending sequence along a particular bending axis when the tensile force acts on the holding element.

4. The device as claimed in claim 3, wherein the holding device comprises:
   a first bending axis which, both in an undeformed state and in a deformed state of the holding device, is arranged below an upper edge of the support structure; and
   a second bending axis which, in the undeformed state of the holding device, is arranged below the upper edge of the support structure and below the first bending axis, and, in the deformed state, is arranged above the upper edge of the support structure.

5. The device as claimed in claim 4, wherein the holding device further comprises:
   a fixing portion delimited by the first bending axis; and
   a lever portion arranged between the first and second bending axes;
   wherein the holding element is delimited by the second bending axis.

6. The device as claimed in claim 2, wherein:
   the holding device includes a first bending axis delimiting a fixing portion, a second bending axis, and a third bending axis delimiting a holding portion, and
   a respective lever portion is formed between the first and second bending axes and between the second and third bending axes.

7. The device as claimed in claim 2, wherein the holding device is formed from a piece of plastically deformable sheet metal.

8. The device as claimed in claim 1, wherein the holding device comprises:
   a first bending axis which, both in an undeformed state and in a deformed state of the holding device, is arranged below an upper edge of the support structure; and
   a second bending axis which, in the undeformed state of the holding device, is arranged below the upper edge of the support structure and below the first bending axis, and, in the deformed state, is arranged above the upper edge of the support structure.

9. The device as claimed in claim 8, wherein the holding device further comprises:
   a fixing portion delimited by the first bending axis; and
   a lever portion arranged between the first and second bending axes;
   wherein the holding element is delimited by the second bending axis.

10. The device as claimed in claim 9, wherein the holding device is formed from a piece of plastically deformable sheet metal.

11. The device as claimed in claim 8, wherein the holding device is formed from a piece of plastically deformable sheet metal.

12. The device as claimed in claim 1, wherein:
    the holding device includes a first bending axis delimiting a fixing portion, a second bending axis, and a third bending axis delimiting a holding portion, and
    a respective lever portion is formed between the first and second bending axes and between the second and third bending axes.

13. The device as claimed in claim 1, wherein the holding device is formed from a piece of plastically deformable sheet metal.

14. The device as claimed in claim 12, wherein the holding device is formed from a piece of plastically deformable sheet metal.

15. The device as claimed in claim 3, wherein the holding device is formed from a piece of plastically deformable sheet metal.

16. A plastically deformable holding device for fixing a child seat to a support structure of a motor vehicle, comprising:
    a first means for attaching the holding device to the support structure;
    a second means for attaching the holding device to a fixing element attached to the child seat; and
    a lever portion, disposed between the first and second means, including at least one bending axis along which the holding device is deformable when a tensile force acts on the second means, wherein
    the holding device has a plurality of bending axes arranged transversely with respect to the vehicle longitudinal direction, and
    the holding device is configured to be successively deformed in a defined bending sequence along a particular bending axis when the tensile force acts on the second means.

17. A plastically deformable holding device for fixing a child seat to a support structure of a motor vehicle, comprising:
    a fixing portion attachable to the support structure;
    a holding portion attachable to a fixing element of the child seat; and a lever portion, disposed between the fixing portion and the holding portion, including at least one bending axis along which the holding device is deformable when a tensile force acts on the holding portion, wherein the holding device has a plurality of bending axes arranged transversely with respect to the vehicle longitudinal direction, and the holding device is configured to be successively deformed in a defined bending sequence along a particular bending axis when the tensile force acts on the holding portion.

* * * * *